United States Patent [19]

Watanabe

[11] Patent Number: 5,336,983
[45] Date of Patent: Aug. 9, 1994

[54] ACCELEROMETER AND ANGULAR ACCELEROMETER

[75] Inventor: Norito Watanabe, Yokohama, Japan

[73] Assignee: Canon Kabushiki Kaisha, Tokyo, Japan

[21] Appl. No.: 10,306

[22] Filed: Jan. 28, 1993

[30] Foreign Application Priority Data

Jan. 31, 1992 [JP] Japan .................................. 4-046267

[51] Int. Cl.⁵ ................................................ G01P 15/13
[52] U.S. Cl. ...................... 318/651; 318/560; 356/375; 73/517 B
[58] Field of Search ................. 356/375, 376; 250/227.11, 227.19; 73/517 B, 517 R, 653, 705; 318/662, 560, 651, 136

[56] References Cited

U.S. PATENT DOCUMENTS

| | | | |
|---|---|---|---|
| 4,206,400 | 6/1980 | Holdren et al. | 318/662 |
| 4,403,144 | 9/1983 | Strahan et al. | 250/231 R |
| 4,678,905 | 7/1987 | Phillips | 73/705 |
| 4,808,817 | 2/1989 | Short | 250/231 SE |
| 4,918,987 | 4/1990 | Vescial | 73/517 B |
| 5,050,435 | 9/1991 | Pinson | 73/517 B |
| 5,061,069 | 10/1991 | Califano | 250/227.19 |
| 5,097,119 | 3/1992 | Breitmier | 356/376 |
| 5,134,881 | 8/1992 | Hemrion et al. | 73/517 R |

FOREIGN PATENT DOCUMENTS

| | | |
|---|---|---|
| 4015668 | 11/1991 | Fed. Rep. of Germany . |
| 1438335 | 4/1966 | France . |
| 61-87363 | 6/1986 | Japan . |
| 2249974 | 10/1990 | Japan . |
| WO9115774 | 10/1991 | PCT Int'l Appl. . |

OTHER PUBLICATIONS

L. Ballard, et al., "Optical FM System for Measuring Mechanical Shock", Journal of Research of the National Bureau of Standards–C. Engineering & Instrumentation, vol. 73C, Nos. 3 and 4, pp. 75–78 (Jul.–Dec. 1969).

"Pendulum Tells Tilt and Acceleration", Machine Design, vol. 46, No. 23, p. 40 (Sep. 1974).

Primary Examiner—William M. Shoop, Jr.
Assistant Examiner—John W. Cabeca
Attorney, Agent, or Firm—Fitzpatrick, Cella, Harper & Scinto

[57] ABSTRACT

An accelerometer includes a main body, a displacing member, a scale, and a detecting unit. The displacing member is attached to the main body and has a displacing portion displaced relative to the main body at least in a direction of acceleration measurement in accordance with a force applied. The scale is provided to one of the main body and the displacing portion to detect displacement in the direction of acceleration measurement. The detecting unit is provided to the other one of the main body and the displacing portion to optically read the relative displacement of the scale. The acceleration applied to the main body is detected by the reading of the relative displacement of the scale performed by the detecting unit during relative displacing of the displacing portion.

14 Claims, 7 Drawing Sheets

15 ARITHMETIC UNIT

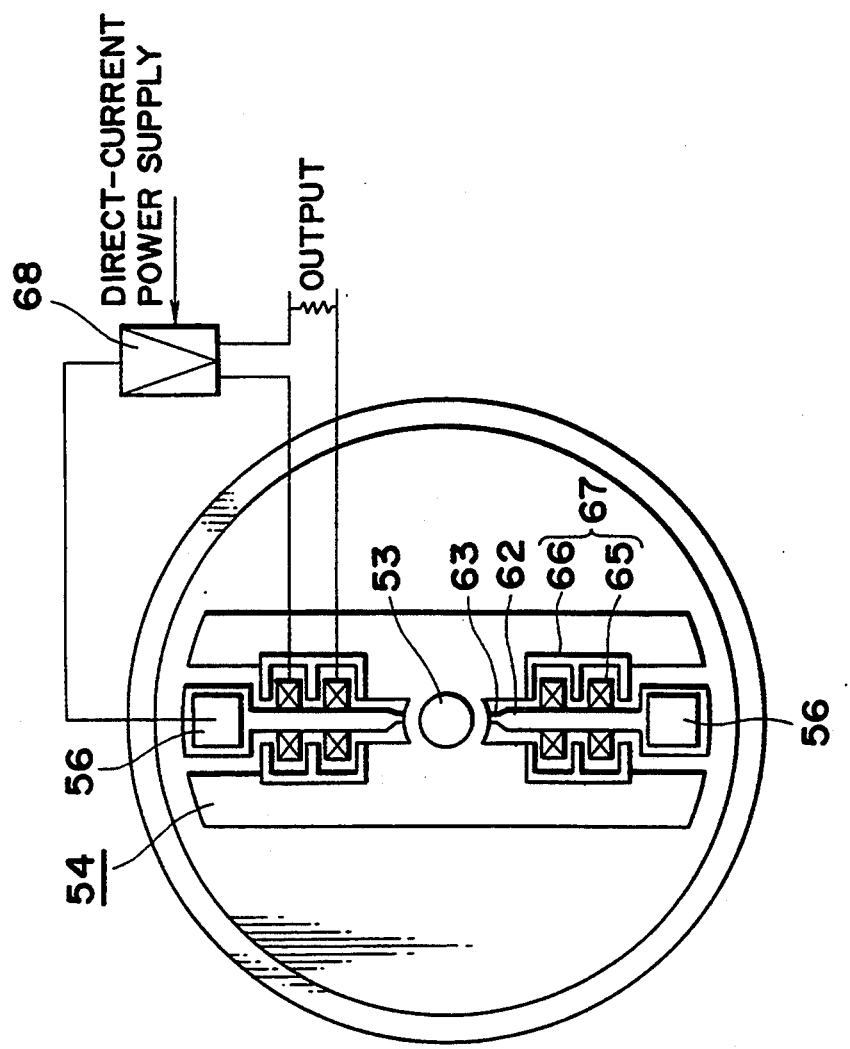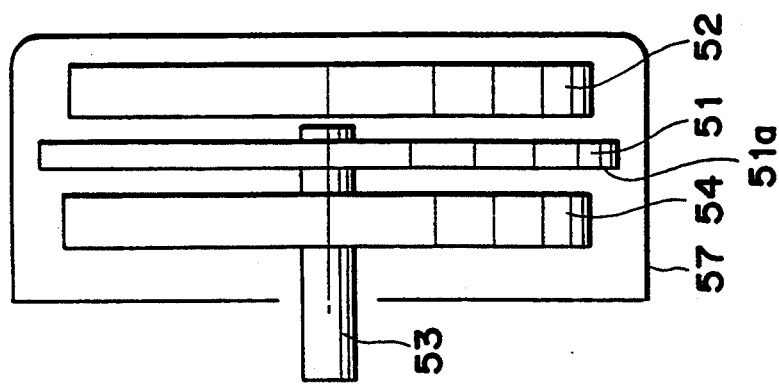

ACCELEROMETER AND ANGULAR ACCELEROMETER

BACKGROUND OF THE INVENTION

1. Field of the Invention

The present invention relates to an accelerometer and an angular accelerometer suitable for, e.g., control of driving of an arm and the like of a robot when used as a displacement sensor.

2. Related Background Art

Conventionally, an accelerometer and an angular accelerometer have been used in various fields of, e.g., a seismometer, a vibrometer, and a shock meter, and control of driving of various arms of a robot.

Many conventional accelerometers (including angular accelerometers) sense displacement of a pendulum or a spring, caused by acceleration, by using a displacement sensor, thereby obtaining the acceleration. Examples of this displacement sensor are an eddy-current type sensor, an electric-capacitance type sensor, and a differential-transformer type sensor. The sensitivities of these displacement sensors are generally, readily influenced by an intense electromagnetic field and are also susceptible to changes in, e.g., temperature and pressure. On the other hand, an optical sensor, such as an encoder, is available as a displacement sensor not easily influenced by environmental changes.

FIG. 1 is a schematic view showing a main part of a displacement detection unit of an accelerometer proposed in Japanese Laid-Open Utility Model Application No. 61-87363.

Referring to FIG. 1, a thin plate-like member 73 having a slit 72 is provided at the end portion of a rod-like pendulum 71 which is displaced on the basis of an acceleration applied to it. A light-emitting unit 74 and a light-receiving unit 75 are arranged to sandwich the thin plate-like member 73 between them. The displacement of the pendulum 71 is obtained by detecting a light quantity balance between two light-receiving elements 75a and 75b constituting the light-receiving unit 75, thereby obtaining the applied acceleration.

FIG. 2 is a schematic view showing a main part of a displacement detection unit of an accelerometer proposed in Japanese Laid-Open Patent Application No. 2-249974.

Referring to FIG. 2, a movable member 83 is provided at one end of a support 82 fixed on a fixed member 81. A light beam from a light-emitting unit 85 is condensed by a condenser lens 84 held by the movable member 83 and is converged onto a light-receiving unit 86. The displacement of the support 82 which is displaced on the basis of an applied acceleration is obtained by detecting a light quantity balance between two light-receiving elements 86a and 86b constituting the light-receiving unit 86, thereby obtaining the applied acceleration.

FIG. 3 is a block diagram showing a main part of an angular accelerometer for controlling driving of an arm of a robot by using a conventional rotary encoder.

Referring to FIG. 3, a detection unit 93 detects an angular position signal from a motor 92 in accordance with a signal from an encoder 91. A first arithmetic unit 94 differentiates the signal from the detection unit 93 to obtain the velocity of the motor. A second arithmetic unit 95 differentiates the velocity signal from the first arithmetic unit 94 to obtain the angular acceleration of the motor 92.

In each of the accelerometers shown in FIGS. 1 and 2, since the signal detected by the light-receiving unit is a signal of an analog quantity, noise components in that signal, for example, cause complexity in arithmetic processing upon performing servo control. This also brings about a problem of difficulty in increasing the detection resolution and the detection sensitivity.

In addition, the light-emitting unit and the light-receiving unit are disposed to oppose each other with the light-transmitting movable member located between them. This arrangement requires a large space, and consequently the overall apparatus tends to increase in size.

The angular accelerometer shown in FIG. 3, on the other hand, requires a complicated circuit for allowing the arithmetic units to differentiate the angular signal obtained by the encoder. The result is a decrease in detection accuracy, and this makes it difficult to control driving of a motor with high accuracy.

SUMMARY OF THE INVENTION

It is a first object of the present invention to provide an optical accelerometer having a simple arrangement as a whole and capable of detecting acceleration with a high accuracy.

It is a second object of the present invention to provide an optical angular accelerometer capable of driving control with a high accuracy.

Other objects of the present invention will become apparent in the description of embodiments of the present invention to be presented later.

BRIEF DESCRIPTION OF THE DRAWINGS

FIGS. 11A and 11B are schematic views showing the fifth embodiment of an optical angular accelerometer according to the present invention.

DESCRIPTION OF THE PREFERRED EMBODIMENTS

Figure 1:
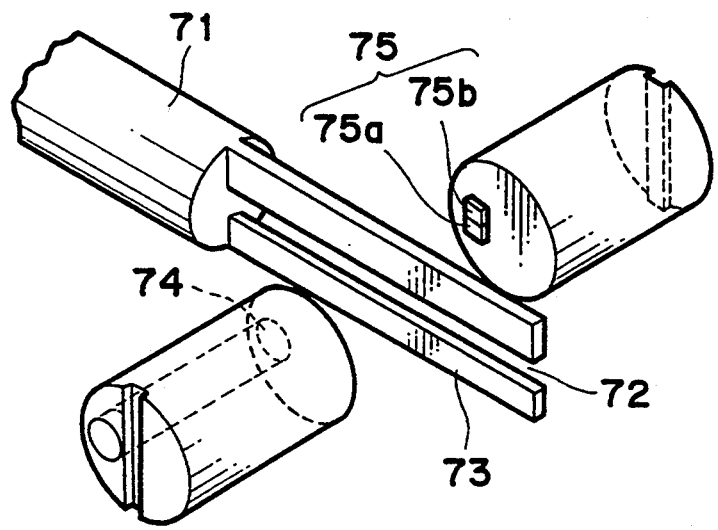
FIG. 1 is a schematic view showing a conventional accelerometer.
Figure 2:
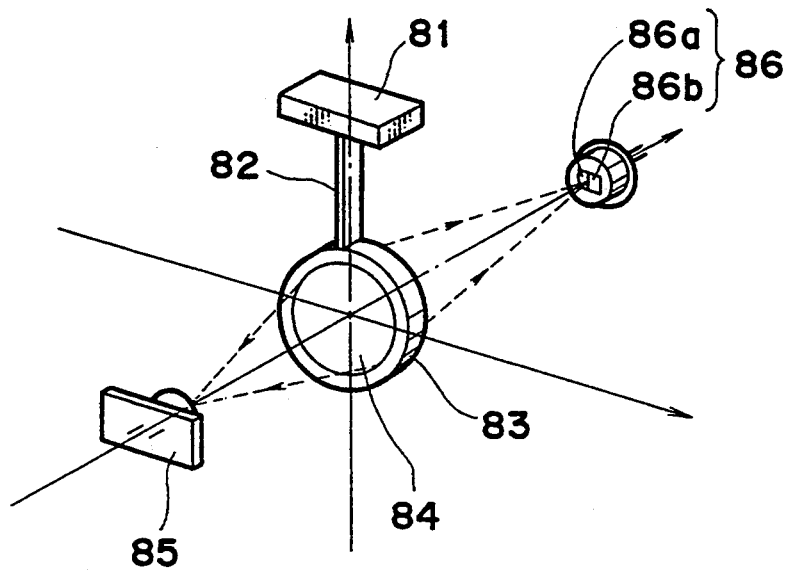
FIG. 2 is a schematic view showing another conventional accelerometer.
Figure 3:
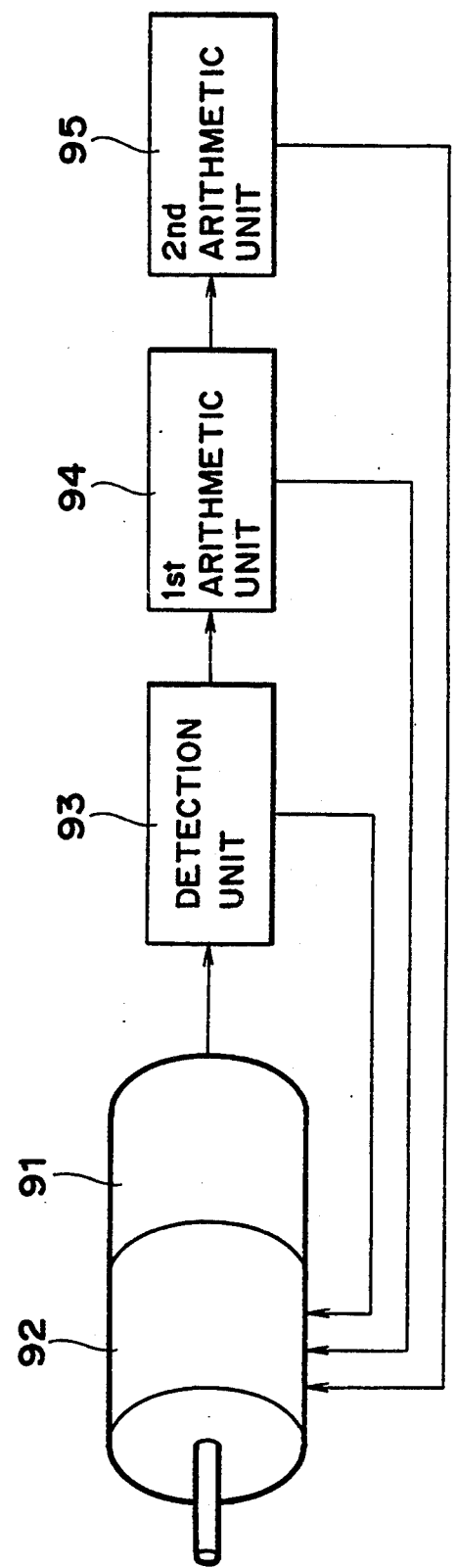
FIG. 3 is a schematic view showing a conventional angular accelerometer.

The characteristic aspects of optical accelerometers according to the embodiments of the present invention to be described below are as follows:

(1) A support which has a scale in its portion and is displaced elastically in the direction of measurement is provided in a housing. An encoder arranged in a portion of the housing optically reads the displacement information of the scale based on an acceleration applied to the housing, thereby obtaining the acceleration applied to the housing.

(2) A support which has a flexure portion at its one end and a scale on the other and is displaced elastically in the direction of measurement is provided in a housing. A driving unit having a coil and a magnet for applying a biasing force to the support is also installed. An encoder arranged in a portion of the housing optically reads the displacement information of the scale based on an acceleration applied to the housing. A servo amplifier circuit controls the driving unit by using an output signal from the encoder to give a recovery force to the support. The support is thus returned to a balanced state, whereby the acceleration applied to the housing is obtained.

The support consists of a leaf spring, and the encoder allows coherent light beams to be incident on the scale to form interference fringes by using diffracted light beams of predetermined orders via the scale. The encoder measures bright-dark fringes of the interference fringes and thereby obtains the displacement information of the scale. The acceleration applied to the housing is obtained by making use of a current value flowing through the coil of the driving unit.

Also, the characteristic aspects of optical angular accelerometers according to the embodiments of the present invention to be described below are as follows:

(3) A disk having a scale is fixed to a rotating shaft placed in a housing. An encoder reading unit provided in a portion of the housing reads the scale on the disk to obtain rotation information of the rotating shaft. In addition, an angular acceleration reading unit, in which an encoder is arranged on a portion of an elastically displaced support, is fixed to the rotating shaft. The encoder optically reads the relative positional relationship between the encoder, which is displaced on the basis of an angular acceleration applied to the rotating shaft, and the scale, thereby obtaining the angular acceleration applied to the rotating shaft.

(4) A disk having a scale is fixed to a rotating shaft provided in a housing. An encoder reading unit arranged in a portion of the housing reads the scale on the disk to obtain the rotation information of the rotating shaft. In addition, an angular acceleration reading unit, in which a flexure portion is provided at one end of an elastically displaced support and an encoder is placed at the other, is fixed to the rotating shaft. A driving unit having a coil and a magnet for applying a biasing force to the support is also installed. The encoder reads the relative positional relationship between the encoder, which is displaced on the basis of an angular acceleration applied to the rotating shaft, and the scale. A servo amplifier circuit controls the driving unit by using an output signal from the encoder to give a recovering force to the support. The support is thus returned to a balanced state, whereby the angular acceleration applied to the rotating shaft is obtained.

The embodiments of the present invention will be described in detail below with reference to the accompanying drawings.

Figure 4:
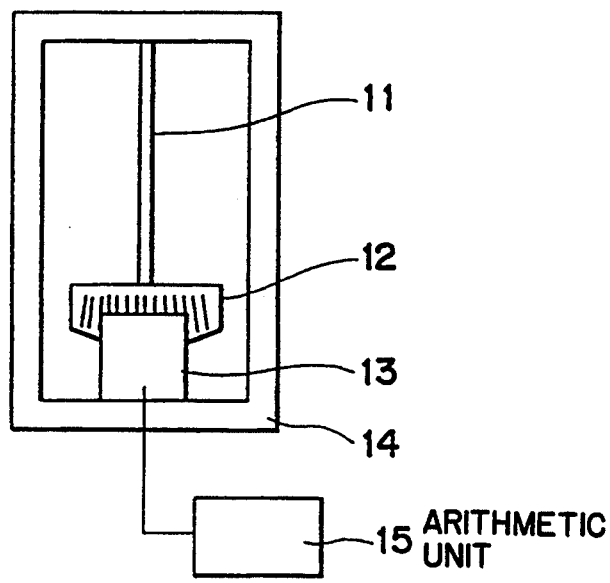
FIG. 4 is a schematic view showing a main part of the first embodiment of an optical accelerometer according to the present invention.

FIG. 4 is a schematic view showing a main part of an optical accelerometer according to the present invention.

Referring to FIG. 4, a support 11 capable of being displaced elastically in the direction of measurement consists of, e.g., a leaf spring and is arranged in a portion of a housing 14. A scale 12 is fixed at one end of the support 11. The scale 12 is constituted by a reflecting diffraction grating.

An optical encoder 13 is arranged to oppose the scale 12. The details of the arrangement of the optical encoder 13 will be described later. When an acceleration is applied to the housing 14, the support 11 is displaced elastically in the direction of the acceleration. The optical encoder 13 optically reads the quantity of displacement of the scale 12 which is fixed to the support 11 and is displaced with the displacement of the support 11. An arithmetic unit 15 calculates the acceleration applied to the housing 14 on the basis of a signal from the optical encoder 13. That is, the displacement quantity of the support 11 depends on an inertial force applied to the scale 12, and this inertial force depends on the acceleration applied to the housing 14. Therefore, relational expression relating these variables is obtained in advance, and the acceleration is calculated from the displacement quantity read by the optical encoder and the relational expression.

Figure 5:
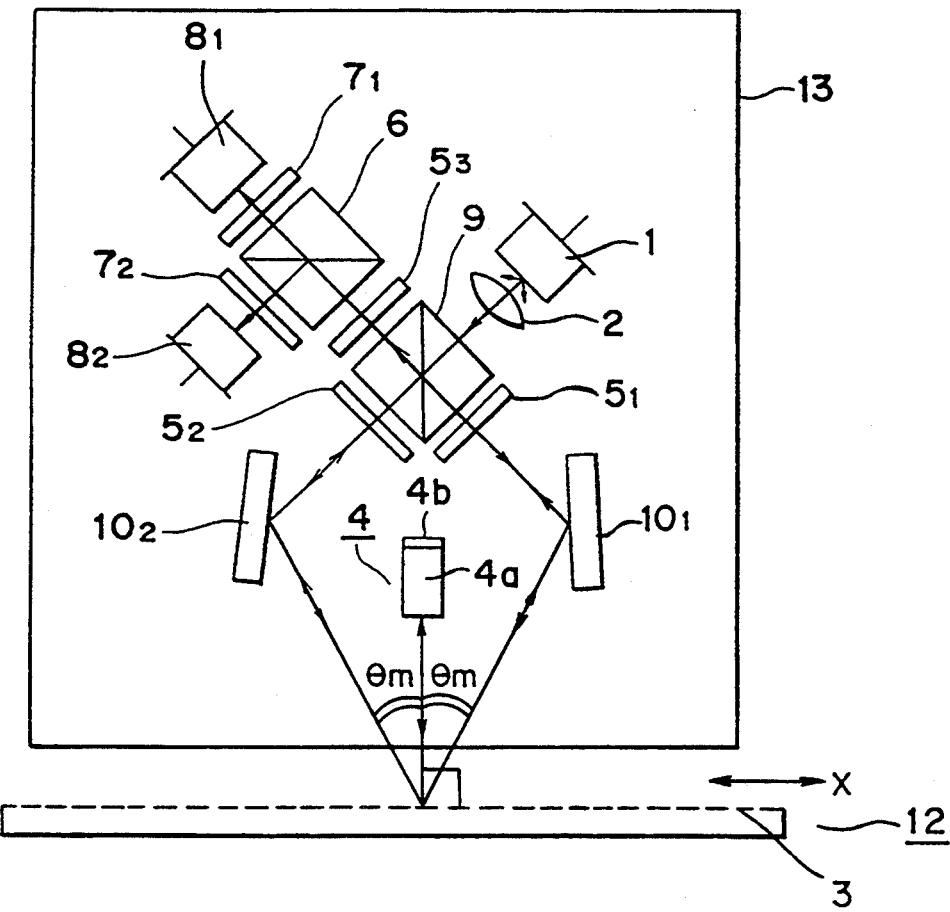
FIG. 5 is a view for explaining the measurement principle of an encoder of a diffracted light interference type according to the present invention.

FIG. 5 is a schematic view showing a main part of the optical encoder 13 applicable to this embodiment. The measurement principle of the optical encoder shown in FIG. 5 will be described below.

Referring to FIG. 5, a coherent light beam from a laser 1 is collimated into a substantially parallel light beam by a collimator lens 2. This parallel light beam is incident on a polarizing beam splitter 9 and thereby split into two light beams, i.e., a linearly polarized transmitted light beam and a linearly polarized reflected light beam. In this case, the position of the laser 1 is adjusted such that the linear polarization azimuth of a light beam emitted from the laser 1 is 45° with respect to the polarizing beam splitter 9. This makes the intensity ratio of the transmitted light beam to the reflected light beam from the polarizing beam splitter 9 equal to substantially 1:1.

The reflected light beam and the transmitted light beam from the polarizing beam splitter 9 are converted into circularly polarized light beams through quarter-wave plates $5_1$ and $5_2$ and reflected by reflecting mirrors $10_1$ and $10_2$. The reflected light beams are incident on a diffraction grating 3 used as the scale 12. In this case, the incident of these light beams is made such that +mth diffracted light of the light beam transmitted through the beam splitter and -mth diffracted light of the light beam reflected by the beam splitter are reflected substantially vertically from the diffraction grating 3.

That is, assuming that the diffraction pitch of the diffraction grating 3 is P, the wavelength of the coherent light beam is $\lambda$, m is an integer, and the angle of incidence of the coherent light beam onto the diffraction grating 3 is $\theta_m$, the light beams are so incident as to satisfy the following relation:

$$\theta_m \simeq \sin^{-1}(m\lambda/P) \qquad (1)$$

Figure 6:
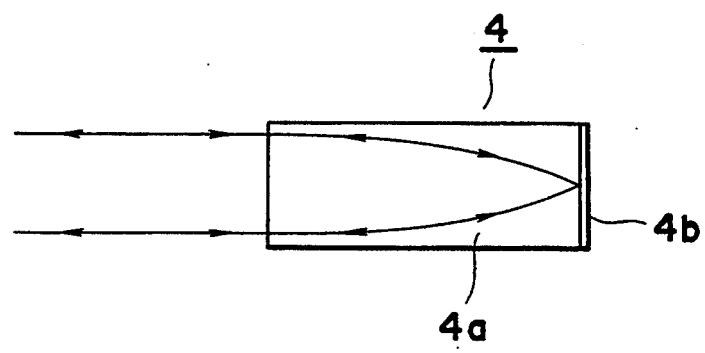
FIG. 6 is a view for explaining a portion of FIG. 5.

The ±mth diffracted light beams substantially vertically emerged from the diffraction grating 3 are incident on an optical member 4a. A reflecting film 4b is formed near the focal surface of the optical member 4a. Therefore, as shown in FIG. 6, the incident light beams are reflected by the reflecting film 4b and emerged from the optical member 4a through the same optical paths. These light beams are incident again on the diffraction grating 3.

The ±mth reflected light beams diffracted by the same orders again by the diffraction grating 3 return through their respective original optical paths. These light beams are reflected by the reflecting mirrors $10_1$ and are $10_2$ and incident again on the polarizing beam splitter 9 through the quarter-wave plates $5_1$ and $5_2$, respectively.

These light beams diffracted again have gone and returned through the quarter-wave plates $5_1$ and $5_2$. Therefore, the light beam first reflected by the polarizing beam splitter 9 is transmitted through it upon the reentrance because the polarization azimuth is different from the first one by 90° with respect to the polarizing beam splitter 9. On the other hand, the light beam first transmitted through the polarizing beam splitter 9 is reflected by it this time.

The two diffracted light beams are superposed by the polarizing beam splitter 9, and the consequent light beam is circularly polarized through a quarter-wave plate $5_3$. The circularly polarized light is split into two light beams by a beam splitter 6, and these two light beams are linearly polarized through polarizing plates $7_1$ and $7_2$. The linearly polarized light beams are incident on light-receiving elements $8_1$ and $8_2$, respectively.

Relation (1) indicates that the angle $\theta_m$ need only fall within a range over which diffracted light beams can be incident on a condenser system 4 and again incident on the diffraction grating 3.

In this embodiment, the phase of the mth diffracted light changes by $2m\pi$ with each movement of one pitch of the diffraction grating. Therefore, the light-receiving elements $8_1$ and $8_2$ receive light beams which have been subjected to ±mth diffraction twice and which interfere with each other, so 4×m sine-wave signals are obtained when the diffraction grating moves one pitch of the grating.

In this embodiment, these sine-wave signals are counted to obtain the quantity of displacement (or rotation if the diffraction grating is placed on a rotary member) of the diffraction grating 3. As an example, if the pitch of the diffraction grating 3 is 3.2 μm and ±primary (m=1) diffracted light is used as the diffracted light, four sine-wave signals are obtained from the light-receiving elements $8_1$ and $8_2$ when the diffraction grating 3 moves 3.2 μm. That is, ¼ of the pitch of the diffraction grating 3, i.e., 3.2/4=0.8 μm is obtained as a resolution per sine wave.

In addition, the combinations of the quarter-wave plates $5_1$, $5_2$, and $5_3$ and the polarizing plates $7_1$ and $7_2$ generate a phase difference of 90° between the output signals from the light-receiving elements $8_1$ and $8_2$. This makes it possible to also determine the direction of movement of the diffraction grating 3. If the amount of movement alone is an object to be measured, only one light-receiving element is needed, and neither the quarter-wave plate $5_3$ nor the beam splitter 6 need be used.

In the condenser system 4 of this embodiment, the reflecting surface is arranged close to the focal surface. Therefore, even if the angle of diffraction slightly changes with a change in oscillation wavelength of a laser beam and consequently the angle of incidence onto the condenser lens more or less changes, light beams can be returned through substantially the same optical paths. This makes it possible to reliably superpose two positive and negative diffracted light beams, thereby preventing reduction in S/N ratios of the output signals from the light-receiving elements $8_1$ and $8_2$.

According to this embodiment as described above, since the scale displacement is read through the use of the grating interference scheme, a high-accuracy measurement is realized with a simple arrangement.

Figure 7:
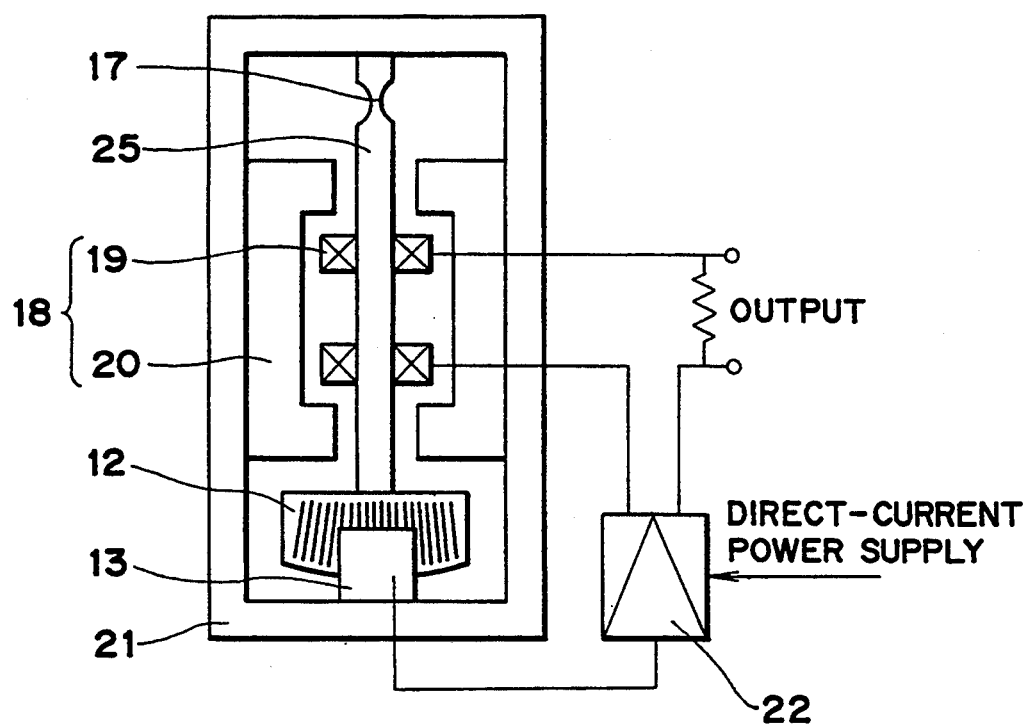
FIG. 7 is a schematic view showing a main part of the second embodiment of an optical accelerometer according to the present invention.

FIG. 7 is a schematic view showing a main part of the second embodiment of an optical accelerometer according to the present invention.

Referring to FIG. 7, a support 25 capable of being displaced elastically in the direction of measurement consists of, e.g., a pendulum. The support 25 is placed inside a housing 21. A flexure portion 17 is provided at one end of the support 25, and a scale 12 is arranged at the other end.

The scale 12 is constituted by a reflecting diffraction grating as in the first embodiment shown in FIG. 4. An optical encoder 13 has the same arrangement as that in the first embodiment of FIG. 4.

A driving unit 18 has a coil 19 and a magnet 20 and applies a biasing force to the support 25. The coil 19 is provided in a portion of the support 25, and the magnet 20 is fixed on the inner wall of the housing 21. A servo amplifier circuit 22 is also installed.

In this embodiment, the support 25 is displaced in the direction of the acceleration applied to the housing 21. The optical encoder 13 optically reads the quantity of displacement of the scale 12 which is displaced together with the support 25. The servo amplifier circuit 22 controls the driving unit 18 by using a signal from the optical encoder 13 to give a recovering force to the support 25, thereby returning the support 25 to a balanced state.

That is, the servo amplifier circuit 22 allows a current to flow through the coil 19 to generate a recovering force proportional to the displacement. This recovering force is directly proportional to the acceleration which has displaced the support 25.

In this embodiment, the current value which flows from the servo amplifier circuit 22 to the coil 19 at that time and which corresponds to a driving force is measured, and an arithmetic unit calculates the acceleration applied to the housing 21 on the basis of the measurement value. That is, a relation between the current value and the acceleration is obtained in advance, and the acceleration is calculated from the measured current value and this relation.

Figure 8:
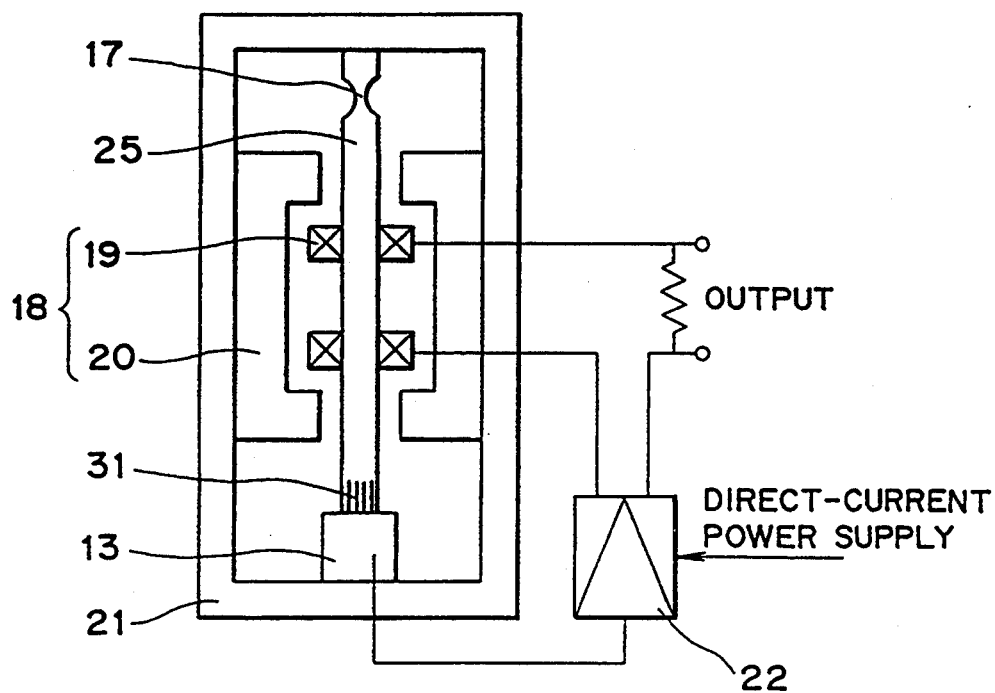
FIG. 8 is a schematic view showing a main part of the third embodiment of an optical accelerometer according to the present invention.

FIG. 8 is a schematic view showing a main part of the third embodiment of an optical accelerometer according to the present invention. In FIG. 8, the same reference numerals as in FIG. 7 denote the same parts.

This embodiment is essentially the same as the second embodiment shown in FIG. 7 except that a scale 31 is provided directly to a portion of a support 25.

Figure 9:
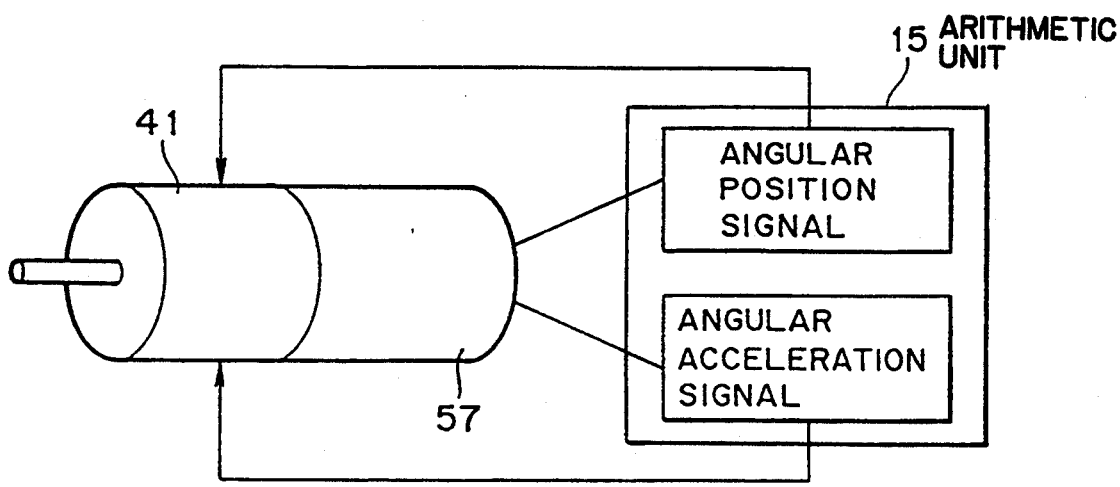
FIG. 9 is a block diagram showing a main part of the fourth embodiment of an optical angular accelerometer according to the present invention.
Figure 10B:
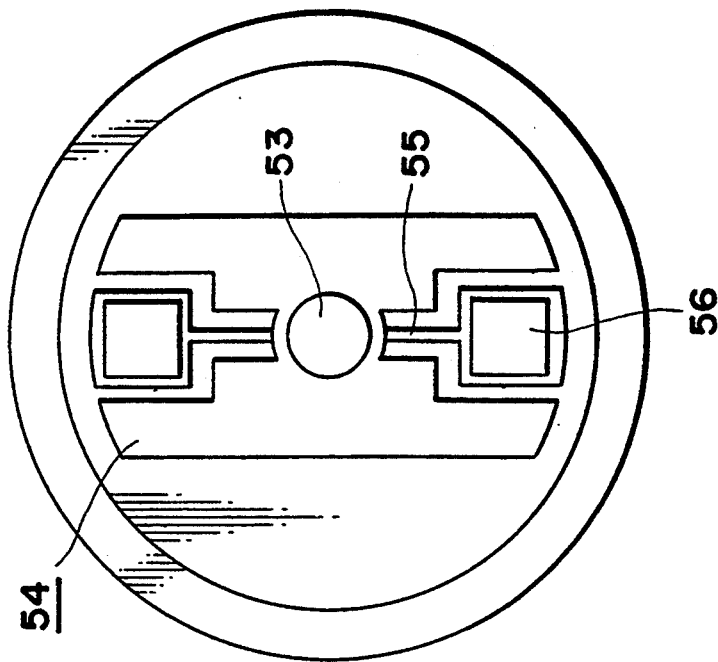
FIGS. 10A and 10B are schematic views showing main parts of the fourth embodiment of an optical angular accelerometer according to the present invention.
Figure 10A:
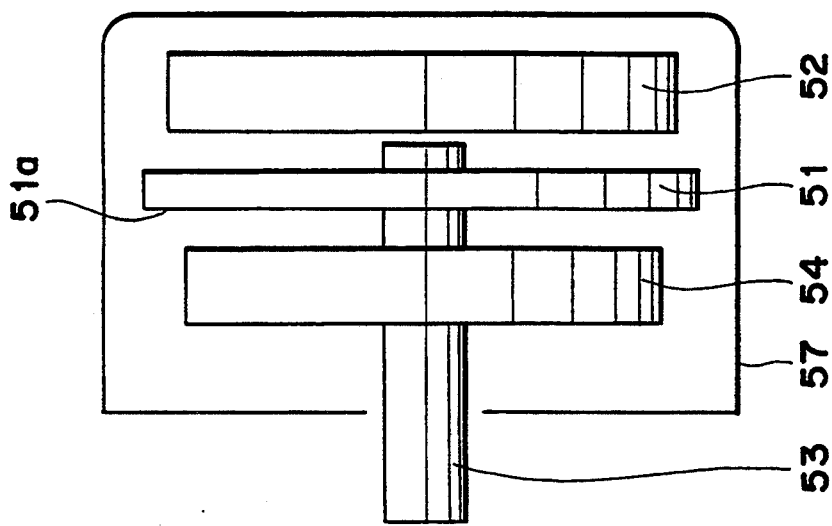

FIG. 9 is a block diagram showing a main part of the fourth embodiment in which an optical angular accelerometer according to the present invention is mounted on a motor. FIGS. 10A and 10B are views for explaining main parts of the optical angular accelerometer in FIG. 9.

In this embodiment, a housing 57 constituted by integrating a rotary encoder and an angular accelerometer is attached to a portion of a motor 41. The rotary encoder detects the rotation information of the motor 41, and at the same time the angular accelerometer directly obtains the angular acceleration of the motor 41, thereby controlling driving of the motor 41 with high accuracy. An arithmetic unit 15 serves as both means for calculating the rotation information and means for calculating the angular acceleration.

FIG. 10A is a sectional view showing a main part inside the housing 57 in FIG. 9, and FIG. 10B is a plan view showing a main part of an angular acceleration reading unit 54 in FIG. 10A.

Referring to FIG. 10A, a rotating shaft 53 is coupled to the motor 41. A disk 51 having a scale 51a and the angular acceleration reading unit 54 are fixed to the rotating shaft 53. The scale 51a consists of a diffraction grating like the scale shown in FIG. 1. An encoder reading unit 52 is arranged in a portion of the housing 57. The encoder reading unit 52 reads the scale 51a on the disk 51 to obtain the rotation information of the rotating shaft 53. The encoder reading unit 52 basically has the same arrangement as that of the encoder shown in FIG. 5.

Referring to FIG. 10B, a support 55 capable of being displaced elastically is constituted by, e.g., a leaf spring. One end of the support 55 is provided in association with the rotating shaft 53, and an encoder 56 is fixed to its other end. The arrangement of the encoder 56 is similar to that of the optical encoder 13 of the first embodiment.

In this embodiment, since the support 55 is displaced when an angular acceleration is applied to the rotating shaft 53, the relative positional relationship between the encoder 56 and the scale 51a is also displaced. The encoder 56 optically reads the quantity of relative displacement of the scale 51a at that time, and the angular acceleration applied to the rotating shaft 53 is calculated by using a signal from the encoder 56. That is, the quantity of relative displacement of the scale 51a depends on the angular acceleration applied to the rotating shaft 53. Therefore, a relational expression concerning between these variables is obtained in advance, and the angular acceleration is calculated in accordance with the displacement quantity read by the encoder and this relation.

FIGS. 11A and 11B are schematic views showing main parts of the fifth embodiment of an optical angular accelerometer according to the present invention. In FIGS. 11A and 11B, the same reference numerals as in FIGS. 10A and 10B denote the same parts. The fifth embodiment is almost the same as the fourth embodiment except for the following features.

FIG. 11A is a sectional view showing a main part inside a housing 57, and FIG. 11B is a plan view showing a main part of an angular acceleration reading unit 54 in FIG. 11A.

Referring to FIGS. 11A and 11B, a support 62 capable of being displaced elastically in the direction of measurement consists of, e.g., a pendulum and is disposed inside the housing 57. A flexure hinge 63 is provided at one end of the support 62, and an encoder 56 is arranged at its other end. A scale 51a formed on a disk 51 consists of a reflecting diffraction grating as in the first embodiment shown in FIG. 4.

An optical encoder 56 has the same arrangement as in the first embodiment of FIG. 4. A driving unit 67 has a coil 65 and a magnet 66 and applies a biasing force to the support 62. The coil 65 is provided on a portion of the support 62, and the magnet 66 is fixed outside the coil 65 so as not to be in contact with the coil 65. A servo amplifier circuit 68 is also installed.

In this embodiment, the support 62 is displaced in the direction of the acceleration applied to a rotating shaft 53. The optical encoder 56 optically reads the quantity of relative displacement of the scale 51a which is displaced together with the support 62.

The servo amplifier circuit 68 controls the driving unit 67 by using a signal from the optical encoder 56 to give a recovering force to the support 62 6, thereby returning the support 62 to a balanced state.

That is, the servo amplifier circuit 68 allows a current to flow through the coil 65 to generate a recovering force proportional to the displacement. This recovering force is directly proportional to the angular acceleration which has displaced the support 62.

In this embodiment, the current value flowing from the servo amplifier circuit 68 to the coil 65 at that time is measured, and an arithmetic unit calculates the angular acceleration applied to the rotating shaft on the basis of the measurement value. That is, a relation between the current value and the angular acceleration is obtained in advance, and the angular acceleration is calculated from the current value measured and this relation.

According to the embodiments of the present invention as described above, there is provided an optical accelerometer capable of detecting an applied acceleration at a high accuracy with a simple apparatus arrangement as a whole by detecting the displacement of a movable part, such as a pendulum, which is displaced on the basis of the applied acceleration, by using an optical encoder. There is also provided an optical angular accelerometer capable of high-accuracy driving control by constituting the angular accelerometer integrally with a rotary encoder for detecting the rotation information of a rotating shaft of a motor or the like, thereby directly obtaining the acceleration of the motor.

The embodiments of the present invention can provide an optical accelerometer and an optical angular accelerometer having the following advantages:

(a) Since the displacement of a pendulum is detected by an optical encoder (optical displacement sensor), the accelerometer is not susceptible to influences of electric and magnetic noise components generated by a coil and a magnet constituting a driving unit. The accelerometer is also unaffected by external electric and magnetic noise components, so signals with high S/N ratios can be obtained.

(b) Since the displacement of the pendulum is detected by the optical displacement sensor, the temperature has only a little effect on the accelerometer.

(c) The use of the optical encoder makes it possible to obtain sine-wave signals from light-receiving elements, and this facilitates arithmetic processing in performing servo control.

(d) Since the position of the pendulum is detected with a high accuracy by taking advantage of a diffraction interference scheme, vibrations can also be detected with a high accuracy.

(e) The displacement of the pendulum can be detected with a high resolution by a small-size, light-weight apparatus. A reflecting type scale can be used and the formation of the scale on the pendulum can miniaturize the overall accelerometer while maintaining its high performance.

(f) The use of the diffraction interference scheme makes it possible to obtain complete sine-wave signals from light-receiving elements, and this facilitates arithmetic processing in performing servo control.

(g) The angle and the angular acceleration can be detected simultaneously with high accuracy.

What is claimed is:

1. An accelerometer comprising:
   a main body;
   a displacing member attached to said main body and having a displacing portion capable of being displaced relative to said main body at least in a rotational direction of angular acceleration measurement in accordance with a forced applied;
   a scale provided in one of said main body and said displacing portion to detect displacement in the rotational direction of angular acceleration measurement; and
   detecting means provided in the other one of said main body and said displacing portion than said scale to optically rear the relative displacement of said scale, the angular acceleration applied to said main body being detected by reading of the relative displacement of said scale by said detecting means during relative displacing of said displacing portion.

2. An accelerometer according to claim 1, wherein said displacing member comprises a member capable of being displaced elastically.

3. An accelerometer according to claim 1, wherein said displacing member comprises a leaf spring.

4. An accelerometer according to claim 1, wherein said main body comprises a housing.

5. An accelerometer according to claim 1, wherein said detecting means comprises a servo circuit for driving, on the basis of the reading result, said displacing member in a direction in which the relative displacement of said displacing portion is canceled, and the angular acceleration applied to said main body is detected by a control signal from said servo circuit.

6. An accelerometer according to claim 5, wherein said servo circuit comprises a coil and a magnet for driving said displacing member.

7. An accelerometer according to claim 6, wherein a current flowing through said coil is used as the control signal to detect the acceleration applied to said main body.

8. An accelerometer according to claim 1, wherein coherent light beams are incident on said scale so that diffracted light beams from said scale interfer with each other, and the diffracted light beams are detected by said detecting means, thereby reading the relative displacement of said scale.

9. An accelerometer according to claim 1, wherein said main body comprises a rotating shaft, and the angular acceleration of said rotating shaft is detected by the reading of the relative displacement of said scale by said detecting means.

10. An angular accelerometer for measuring an angular acceleration of a rotary member, comprising:
    a displacing member mounted on said rotary member and having a displacing portion capable of being displaced relative to said rotary member at least in a direction of angular acceleration measurement in accordance with a rotational force applied;
    a scale provided in one of said rotary member and said displacing portion to detect the rotational displacement in the direction of angular acceleration measurement; and
    detecting means provided in the other one of said rotary member and said displacing portion than said scale to optically read the relative rotational displacement of said scale, the angular acceleration applied to said rotary member being detected by the reading of the relative rotational displacement of said scale by said detecting means during relative rotational displacing of said displacing portion.

11. An accelerometer according to claim 10, further comprising rotation information detecting means for detecting rotation information of said rotary member.

12. An accelerometer according to claim 11, further comprising means for controlling rotation of said rotary member on the basis of the rotation information and angular acceleration detected.

13. A driving system for controlling driving of a predetermined member, comprising:
    a displacing member mounted on said predetermined member and having a displacing portion capable of being displaced relative to said predetermined member at least in a rotational direction of angular acceleration measurement in accordance with a force applied;
    a scale provided in one of said predetermined member and said displacing portion to detect the displacement in the rotational direction of angular acceleration measurement;
    detecting means provided in the other one of said predetermined member and said displacing portion than said scale to optically read the relative displacement of said scale, the angular acceleration applied to said predetermined member being detected by the reading of the relative displacement of said scale by said detecting means during relative displacing of said displacing portion; and
    a control unit for controlling driving of said predetermined member in accordance with the angular acceleration detected by said detecting means.

14. A system according to claim 13, wherein said predetermined member is capable of pivoting, and the angular acceleration of said predetermined member is detected as the acceleration by the reading of the relative displacement of said scale by said detecting means.

* * * * *

UNITED STATES PATENT AND TRADEMARK OFFICE
CERTIFICATE OF CORRECTION

PATENT NO. : 5,336,983
DATED : August 9, 1994
INVENTOR(S) : Watanabe

Page 1 of 2

It is certified that error appears in the above-indentified patent and that said Letters Patent is hereby corrected as shown below:

ON THE TITLE PAGE, ITEM [56] REFERENCES CITED:

U.S. PATENT DOCUMENTS, "4,918,987 4/1990 Vescial" should read --4,918,987 4/1990 Vescial et al.--. "5,097,119 3/1992 Breitmier" should read --5,097,119 3/1992 Breitmeier-- and "5,134,881 8/1992 Hemrion et al." should read --5,134,881 8/1992 Henrion et al.--.

FOREIGN PATENT DOCUMENTS, "2249974 10/1990 Japan" should read --2-249974 10/1990 Japan--.

COLUMN 5:

Line 14, "are $10_2$ and" should read --$10_2$ and are--.

COLUMN 8:

Line 11, "62 6," should read --62,--.

COLUMN 9:

Line 14, "forced" should read --force--.

UNITED STATES PATENT AND TRADEMARK OFFICE
CERTIFICATE OF CORRECTION

PATENT NO. : 5,336,983
DATED : August 9, 1994
INVENTOR(S) : Watanabe

Page 2 of 2

It is certified that error appears in the above-indentified patent and that said Letters Patent is hereby corrected as shown below:

Line 21, "rear" should read --read--.
Line 51, "interfer" should read --interfere--.

Signed and Sealed this

Eleventh Day of April, 1995

Attest:

BRUCE LEHMAN

*Attesting Officer*　　　*Commissioner of Patents and Trademarks*